D. O. FORD.
DRIVE BELT UNSHIPPER.
APPLICATION FILED OCT. 30, 1919.
1,355,461.
Patented Oct. 12, 1920.
2 SHEETS—SHEET 1.
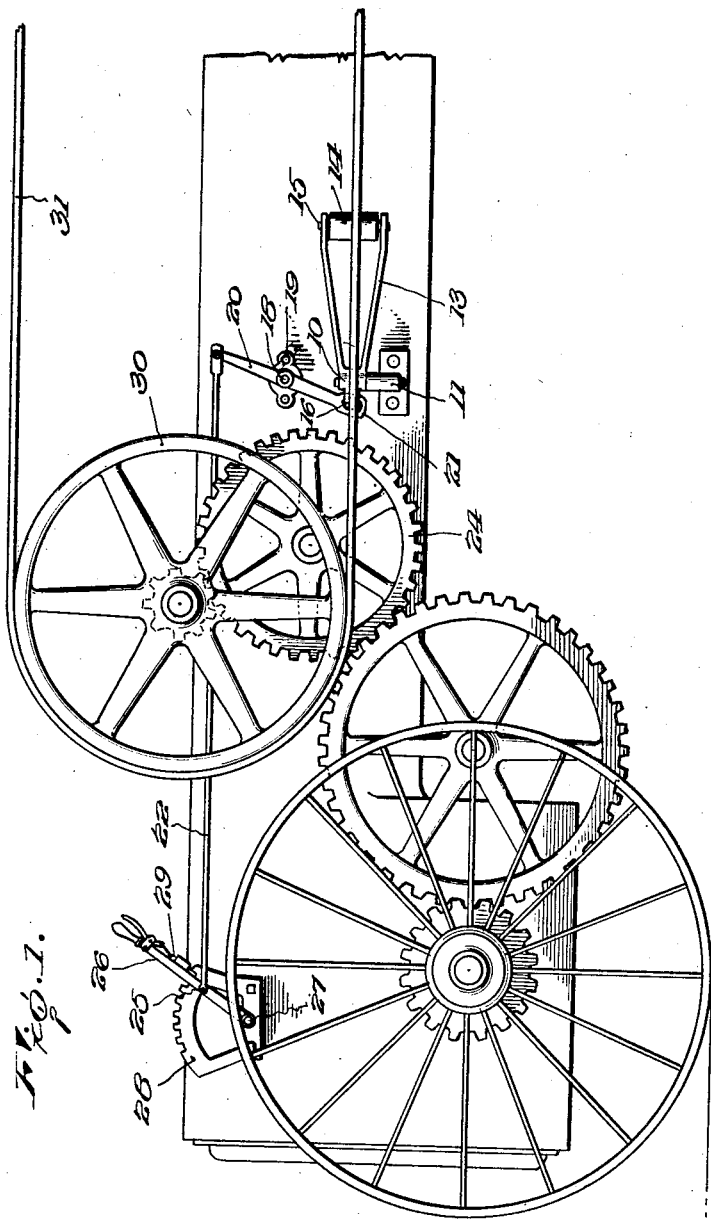
INVENTOR.
David O. Ford.

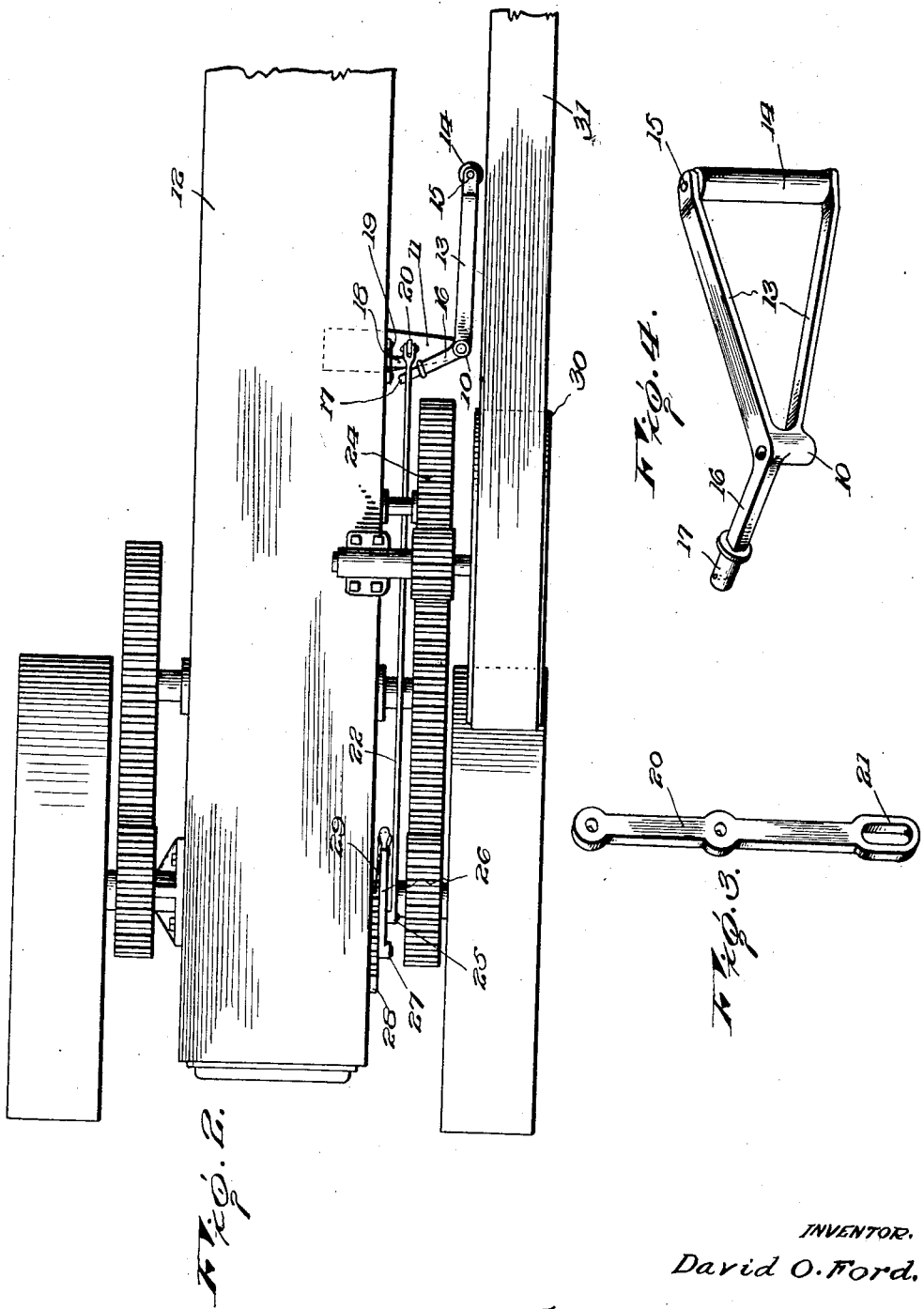

UNITED STATES PATENT OFFICE.

DAVID O. FORD, OF WAUNETA, NEBRASKA.

DRIVE-BELT UNSHIPPER.

1,355,461.  Specification of Letters Patent.  Patented Oct. 12, 1920.

Application filed October 30, 1919. Serial No. 334,473.

*To all whom it may concern:*

Be it known that I, DAVID O. FORD, a citizen of the United States, residing at Wauneta, in the county of Chase and State of Nebraska, have invented certain new and useful Improvements in Drive-Belt Unshippers, of which the following is a specification.

This invention relates to improvements in devices for suddenly throwing drive belts off from the drive pulley, and has for one of its objects to provide a simply constructed device which may be readily arranged for coöperation with machinery in various localities and employed for various purposes.

The device is designed more particularly for use in connection with engines employed in farm operations, especially threshing engines, and for the purpose of illustration the device is shown in the drawings connected to a portion of an engine and boiler of this class, but it will be understood that it is not desired to limit the invention to any specific machinery.

In the drawings illustrative of the preferred embodiment of the invention—

Figure 1 is a side elevation of a portion of a conventional traction engine with the improvement applied;

Fig. 2 is a plan view of a portion of the mechanism disclosed in Fig. 1;

Fig. 3 is an enlarged perspective view of the operating lever of the improved device;

Fig. 4 is an enlarged detailed perspective view of the main belt displacing member of the improved device.

Corresponding and like parts are referred to in the following description and indicated in all the views of the drawings by the same reference characters.

In the operation of many classes of machinery, especially threshing engines and the like, it is frequently necessary to suddenly stop the mechanism being driven, and this is usually accomplished by throwing the drive belt off from the drive pulley, but this is a dangerous operation when performed manually, and the device which is the subject of the present invention is designed to enable the engineer to suddenly throw the belt off from the drive pulley when an emergency arises requiring such action. The necessity for thus throwing the belt also arises in connection with machinery other than threshing outfits and the improved device may be adapted without material structural change to various forms of machinery.

The improved device comprises a belt displacing member preferably constructed as shown in Fig. 4 and comprising a hub or center 10 pivotally mounted upon a bracket 11 attached to the boiler, represented conventionally at 12. Branching from the hub 10 are arms 13 diverging toward their outer ends and supporting a roller 14 between their free ends, the latter being pivoted as shown at 15 so that it rotates freely between the terminals of the arms 13. Branching from the hub 10 is a shorter arm 16 having a stud or pin 17 at its free end. Pivoted at 18 to a bracket 19 attached to the boiler 12 is a lever arm 20 having a longitudinally directed slot 21 at its lower end to engage over the stud 17. Leading rearwardly from the upper end of the lever 20 is a rod 22 which passes the gearing 24 of the traction engine and is pivoted at 25 to a lever 26, the latter in turn being pivoted at 27 to a toothed segment 28 attached to the boiler 12 at any point convenient to the engineer's platform. The lever 26 is provided with a pawl device 29 coacting with the notches of the segment 28. The main drive pulley is represented conventionally at 30 and the drive belt at 31, and the bracket 11 is so located that the roller 14 will be normally located adjacent to the belt 31. When the engine is operating under ordinary conditions the improved device will remain inactive, but if an emergency arises requiring the instantaneous unshipping of the belt, the engineer by simply actuating the lever 26 can instantly throw the roller 14 forcibly against the belt and cause it to run off from the drive pulley 30 and thus instantly releases the mechanism which is being driven by the engine and without the necessity for stopping the engine.

The improved device is simple in construction, can be readily applied to machinery of various forms and arranged to coöperate with engines driven by steam, gas or other power.

Having thus described the invention, what is claimed as new is:

1. In a device of the class described, a bracket device adapted to be supported adjacent to a power transmitting belt and having a vertical pin, an arm mounted to swing upon and about said pin and including a forked portion and a projection disposed at an angle to the forked portion and terminating in a stud alined axially with the major portion of the projection, a roller mounted for rotation between the terminals of the forked portion of the arm, a vertically disposed lever pivoted between its ends above the arm and having a longitudinal slot in the lower end engaging over said stud, and means for actuating said lever to cause said roller to move into the path of said belt and run the same off from the belt pulley.

2. The combination with a boiler and engine including a drive shaft and belt pulley and a power transmitting belt operating over the pulley, of a bracket device connected to said boiler, an arm swinging from said bracket device and having a lateral stud, a lever pivoted to said boiler to swing in a plane intersecting the plane of the arm and having a longitudinally directed slot engaging said stud, and means for actuating said lever to cause said arm to move into the path of said belt and run the same off from the belt pulley.

In testimony whereof I affix my signature.

DAVID O. FORD. [L. S.]